(12) United States Patent
Saito et al.

(10) Patent No.: US 6,884,535 B2
(45) Date of Patent: Apr. 26, 2005

(54) FUEL CELL SEPARATOR

(75) Inventors: Kazuo Saito, Chiba (JP); Atsushi Hagiwara, Chiba (JP); Seiji Yamamoto, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 333 days.

(21) Appl. No.: 09/901,576

(22) Filed: Jul. 11, 2001

(65) Prior Publication Data

US 2002/0034672 A1 Mar. 21, 2002

Related U.S. Application Data

(63) Continuation-in-part of application No. 09/323,960, filed on Jun. 2, 1999, now abandoned.

(30) Foreign Application Priority Data

Jun. 5, 1998 (JP) .......................................... 10-157799

(51) Int. Cl.$^7$ ............................. H01M 2/00; B05D 5/12
(52) U.S. Cl. ........................... 429/34; 427/115; 252/500
(58) Field of Search ............................ 429/34; 252/500, 252/511, 510; 427/115

(56) References Cited

U.S. PATENT DOCUMENTS

| 4,000,005 A | * | 12/1976 | McBreen ..................... 429/212 |
| 5,840,414 A | | 11/1998 | Bett et al. .................... 428/307 |
| 5,942,347 A | | 8/1999 | Koncar et al. ................. 429/30 |

FOREIGN PATENT DOCUMENTS

| EP | 0 928 036 A1 | 7/1999 | |
| JP | 49-002023 | * 8/1978 | ............ H01M/2/14 |
| JP | 10-270062 | * 10/1998 | ............ H01M/8/02 |
| WO | 95/21465 A1 | 8/1995 | |

OTHER PUBLICATIONS

Patent Abstract of Japan, Publication No. 63–294610, Publication Date Dec. 1, 1988.
Patent Abstract of Japan, Publication No. 62–122057, Publication Date Jun. 3, 1987.
Patent Abstract of Japan, Publication No. 63–034858, Publication Date Feb. 15, 1988.
Database WPI, Section Ch, Week 197503, Derwent Publications Ltd., London, GB; AN 1975–0479W, XP002180591, & JP 49–047100 B, Dec. 13, 1974.
Patent Abstract of Japan, Publication No. 59–046763, Publication Date Mar. 16, 1984.
Patent Abstract of Japan, Publication No. 04–236940, Publication Date Aug. 25, 1992.
Patent Abstract of Japan, Publication No. 09–320577, Publication Date Dec. 12, 1997.
Patent Abstract of Japan, Publication No. 63–105473, Publication Date May 10, 1988.
Database WPI, Section Ch, Week 198551, Derwent Publications Ltd., London, GB; AN 1985–319577, XP002180593, & JP 60–221909 A, Nov. 6, 1988.
Patent Abstract of Japan, Publication No. 10–140141, Publication Date May 26, 1998.
Patent Abstract of Japan, Publication No. 10–326631, Publication Date Dec. 8, 1998.

* cited by examiner

*Primary Examiner*—Stephen Kalafut
*Assistant Examiner*—Raymond Alejandro
(74) *Attorney, Agent, or Firm*—Kubovcik & Kubovcik (57) ABSTRACT

A separator for a fuel cell, having a film on the surface, wherein the film has a water-holdability of 0.3 to 5.0 g per g of the film, or the film has a pore volume of 0.5 to 0.9 cc per cc of the film, and a thickness of 0.5 to 300 μm. The fuel cell separator is superior in hydrophilicity and water-holding property, and has at the same time low electrical resistance.

8 Claims, 2 Drawing Sheets

FUEL CELL SEPARATOR

This application is a continuation-in-part of application Ser. No. 09/323,960, filed Jun. 2, 1999 now abandoned.

BACKGROUND OF THE INVENTION

1. Field of the Invention

The present invention relates to a fuel cell separator. More particularly, the present invention relates to a fuel cell separator superior in hydrophilicity and water-holding property, and having at the same time low electrical resistance.

2. Description of the Prior Art

Fuel cells are advantageous in that they require substantially no fossil fuel (whose depletion in the near future is feared) and, when used for power generation, generate substantially no noise and are high in energy recovery as compared with other methods for power generation. Therefore, fuel cells are being developed as a power generation plant of relatively small size for buildings and factories.

Among fuel cells, a solid polymer type fuel cell operates at lower temperatures than do other types of fuel cells. Therefore, it has such characteristics that not only the parts constituting the cell are little corroded, but also the cell can discharge a relatively large electric current for a low temperature operation. Therefore, the solid polymer type fuel cell is drawing attention as a substitute electric source for internal combustion engines of vehicles.

Among the parts constituting the above solid polymer type fuel cell, the separator is generally a flat plate having a plurality of parallel grooves formed at one or both sides, and has a role of transferring the electricity generated at the gas diffusion electrode of the fuel cell to the exterior and also a role of discharging the water formed in the grooves in the course of electricity generation, to reliably use each groove as a path for a reactant gas which is allowed to flow into the fuel cell. Accordingly, the separator for a solid polymer type fuel cell is desired to have not only electrical conductivity but also high water-drain ability.

Therefore, as a fuel cell separator, there have heretofore been used those subjected to a hydrophilization treatment at least at the surface. Owing to this hydrophilization treatment at least at the surface, the water formed in the course of electricity generation wets the grooves and spreads therein, or is allowed to flow to a given position of the path for reactant gas; thereby, the water formed does not remain as droplets in the grooves and does not hinder the diffusion of reactant gas through the path.

In order to make the fuel cell separator hydrophilic, there were proposed, for example, a method in which the material for a fuel cell separator is molded into a predetermined shape and thereafter the molded material is coated with a hydrophilic material (e.g., a polyacrylonitrile) and a method in which a hydrophilic material is incorporated into the material for a fuel cell separator and the resulting material is molded into a predetermined shape.

However, it is pointed out that the conventional methods mentioned above have the following problems.

For example, as to the method in which the material for a fuel cell separator is molded into a predetermined shape and thereafter the molded material is coated with a hydrophilic material (e.g. a polyacrylonitrile), it is pointed out that since ordinary All: hydrophilic materials have no electrical conductivity, the hydrophilic material coated on the molded material becomes an insulating film covering the whole surface of the separator and this insulating film must be removed at the portions of the separator contacting with the gas-diffusion electrode of a fuel cell, resulting in an increase in cost.

Moreover, as to the method in which a hydrophilic material is incorporated into the material for a fuel cell separator and then the resulting material is molded into a predetermined shape, it is pointed out that although a reduction in cost can be expected, the resistivity of the whole separator is increased because ordinary hydrophilic materials have no electrical conductivity, and the performance of the fuel cell is deteriorated. Therefore, solutions for the above problems have been desired.

Apart from the above problems, it is necessary in the solid polymer type fuel cell to incorporate a humidifier thereinto in order to keep the electrolyte film always in a wet state. This makes the structure of the solid polymer type fuel cell complicated and requires extra labor for the maintenance of the solid polymer type fuel cell.

SUMMARY OF THE INVENTION

The present invention has been completed in order to solve the above-mentioned problems of the prior art and provides a fuel cell separator superior in hydrophilicity and water-holding property, and having at the same time low electrical resistance.

According to the present invention, there is provided a separator for a fuel cell having a film on the surface, wherein the film has a water-holdability of 0.3 to 5.0 g per g of the film, or the film has a pore volume of 0.5 to 0.9 cc per cc of the film, and a thickness of 0.5 to 300 $\mu$m.

BRIEF DESCRIPTION OF THE DRAWINGS

In FIG. 1, numeral 1 refers to a base material for a fuel cell separator; numeral 2 refers to a film made of a conductive coating; numeral 3 is a hole formed by the perishing of a perishable additive; and numeral 4 refers to a surface unevenness caused by secondary particles of conductive powder.

DETAILED DESCRIPTION OF THE INVENTION

An example of the process for producing the present fuel cell separator comprises applying a conductive coating of particular composition onto a base material having a fuel cell separator shape, to form, on the base material, a film made of the conductive coating. Description is made first of the conductive coating of particular composition.

The conductive coating used in the present invention comprises a conductive powder, a binder and a perishable additive used as necessary. Of these components, the conductive powder includes, for example, a powder of a carbon material typified by natural graphite (e.g. scaly graphite or lumpy graphite), artificial graphite, acetylene black, carbon black, Ketjen black, expanded graphite or the like. There is no particular restriction as to the kind of the conductive powder as long as the powder is conductive.

The conductive powder can have an average particle diameter of, for example, 10 nm to 100 μm. The conductive powder may be subjected, as necessary, to a hydrophilization treatment by control of firing conditions or by using a chemical, a gas or the like. At least one or a combination of these means can be used for the hydrophilization.

The binder used in the conductive coating may be any binder which can withstand the temperature range in which a fuel cell is operated. The binder includes, for example, a liquid or emulsion of thermosetting resin, thermoplastic resin, rubber or the like.

The thermosetting resin includes, for example, polycarbodiimide resin, phenolic resin, furfuryl alcohol resin, epoxy resin, cellulose, urearesin, melamine resin, unsaturated polyester resin, silicone resin, diallyl phthalate resin, resin obtained by using bismaleimide and triazine, polyaminobismaleimide resin and aromatic polyimide resin. These resins can be used singly or in admixture of two or more kinds.

The thermoplastic resin includes, for example, polyethylene, polystyrene, polypropylene, polymethyl methacrylate, polyethylene terephthalate, polybutylene terephthalate, polyethersulfone, polycarbonate, polyoxamethylene, polyamide, polyimide, polyamideimide, polyvinyl alcohol, polyvinyl chloride, polyphenylsulfone, polyetheretherketone, polysulfone, polyetherketone, polyarylate, polyetherimide, polymethylpentene, fluororesin, polyoxybenzoyl ester resin, liquid crystal polyester resin, aromatic polyester, polyacetal, polyallylsulfone, polybenzimidazole, polyethernitrile, polythioethersulfone and polyphenylene ether. These resins can be used singly or in admixture of two or more kinds.

The rubber includes, for example, fluororubber, silicone rubber, butyl rubber, chloroprene rubber, nitrile rubber, nitrile-chloroprene rubber, chlorinated butyl rubber, epichlorohydrin rubber, epichlorohydrin-ethylene oxide rubber, epichlorohydrin-ethylene oxide-acryl glycidyl ether terpolymer, urethane rubber, acrylic rubber, ethylenepropylene rubber, styrene rubber, butadiene rubber and natural rubber. These rubbers can be used singly or in admixture of two or more kinds.

The perishable additive used as necessary in the conductive coating includes, for example, a material which vaporizes when heated, or a material which dissolves in an elutant when immersed therein. Thus, the perishable additive can be any additive which can be allowed to perish after a film made of the conductive coating has been formed.

As the perishable additive which vaporizes when heated, there can be mentioned, for example, a low-molecular weight substance, a wax and a saccharide. As the material which dissolves in an elutant when immersed therein, there can be mentioned, for example, a polyvinyl alcohol, a saccharide and a cellulose derivative. These additives can be used singly or in an admixture of two or more kinds.

There is no particular restriction as to the form of the perishable additive. However, the perishable additive is preferably in the form of a powder and the average particle diameter can be, for example, 0.1 to 500 μm.

The conductive coating can further contain a stabilizer, an anti-foaming agent, a dispersant, etc.

The conductive coating used in the present invention can be obtained by mixing the above-mentioned components using a mixer. The mixer can be any mixer ordinarily used such as mixer, homogenizer, stirrer, ball mill or the like, and there is no particular restriction as to the mixer used.

The proportions of the components when no perishable additive is used, are, for example, 100 parts by weight of the conductive powder and 1 to 1,000 parts by weight, preferably 3 to 500 parts by weight of the binder. When the proportion of the binder is less than 1 part by weight, the adhesion between the film made of the conductive coating and the base material for the separator is insufficient and the film tends to peel off. When the proportion of the binder is more than 1,000 parts by weight, the film is low not only in electrical conductivity but also in water-holding property and there may appear water droplets of such an amount that the paths for reactant gas in the separator are blocked.

The proportions of the components when the perishable additive is used, are, for example, 100 parts by weight of the conductive powder, 1 to 1,000 parts by weight, preferably 3 to 500 parts by weight, of the binder, and 0.1 to 100 parts by weight of the perishable additive. As the proportion of the perishable additive is larger, the resulting fuel cell separator has higher water-holding property. However, when the proportion of the perishable additive is larger than 100 parts by weight, the film made of the conductive coating has insufficient adhesivity and may easily peel off from the base material.

In the above step for components mixing, a solvent may be used as necessary for viscosity control. As the solvent, there can be mentioned, for example, water, methanol, ethanol, isopropyl alcohol, butanol, toluene, xylylene and methyl ethyl ketone. The amount of the solvent used is about 50 to 3,000% by weight based on the total solids content of the conductive coating.

As the base material for fuel cell separator, used in the present invention, there can be mentioned, for example, a carbon composite separator material obtained by mixing a carbon material and a binder and molding the resulting mixture into a separator shape; a carbon separator material obtained by converting a carbon material (e.g. glassy carbon or graphite) into a separator shape by machining; a metal separator material obtained by converting a metal (e.g. titanium, aluminum or stainless steel) into a separator shape by machining or by pressing; a coated separator material obtained by coating the above-obtained separator material with a noble metal or a carbon material; and a separator material obtained by combining two or more kinds of the above separator materials.

The above base material for fuel cell separator generally has paths for passing a reactant gas therethrough, grooves for draining the water formed in an electricity-generating reaction, etc.

In the present invention, the above-mentioned conductive coating is applied onto such a base material for fuel cell separator. Prior to this application, in order to improve the adhesivity between the base material for fuel cell separator and the conductive coating, the base material for fuel cell separator may be subjected to a surface-roughening treatment by blasting or by using a chemical or the like, or may be coated with an adhesive such as a primer or the like.

The application of the conductive coating onto the base material for fuel cell separator can be conducted by a known method such as casting, dip coating, spraying, brush coating, screen printing or the like. The application is made on part or the whole area of the base material so as to meet the purpose.

The amount of the conductive coating applied can be determined a depending upon the solids content of the conductive coating so that the thickness of the as-dried film made of the conductive coating becomes 0.5 to 300 μm, preferably 1 to 200 μm. In practical application, the solids content of the conductive coating is controlled based on the application method and the desired thickness of the film formed.

Then, in the present process, the base material for fuel cell separator onto which the conductive coating has been applied, is dried by, for example, placing it in a dryer, to cure the conductive coating and form a film made of the conductive coating. As necessary, the conductive coating may be reapplied onto the film formed, in order to strengthen the film.

The temperature employed for the above drying can be, for example, 30 to 200° C.

The thus obtained fuel cell separator of the present invention has a thickness of 0.5 to 300 μm. When the thickness is less than 0.5 μm, the strength of the film is insufficient, and there is a problem in that the film may be easily peeled off from the base material. When the thickness is more than 300 μm, the electrical resistance becomes higher, and the efficacy of a fuel cell becomes lower; and there is also a problem in that the film may be easily peeled off from the base material, since the strength of a too thick a film is insufficient.

In the present process for production of a fuel cell separator, when no perishable additive is used, the base material on which a film of the conductive coating has been formed, becomes a fuel cell separator (1) of the present invention. This fuel cell separator (1) has sufficient hydrophilicity and water-holding property mainly at the surface. The hydrophilicity and water-holding property of the separator (1) is specifically expressed "amount of water held per unit weight of film" and is in the range of 0.3 to 3.0 g/g.

The reason why the fuel cell separator (1) has sufficient hydrophilicity and water-holding property mainly at the surface is not clear, but is presumed to be that the conductive powder used in the conductive coating becomes secondary particles in the coating and these secondary particles form fine unevennesses or cracks at the surface of and/or inside the film made of the conductive coating.

It is also possible to employ a large temperature elevation rate in drying the conductive coating applied onto the base material and thereby form microcracks caused by shrinkage at the surface of the resulting film. As the fine unevennesses, cracks and microcracks at the surface of and/or inside the film made of the conductive coating are more, the hydrophilicity and water-holding property of the film is presumed to be higher.

When the perishable additive is used, a fuel cell separator (2) having higher hydrophilicty and water-holding property mainly at the surface can be obtained by allowing the perishable additive to perish. The hydrophilicity and water-holding property of the separator (2) is specifically expressed as "amount of water held per unit weight of film" and is in the range of 0.3 to 5.0 g/g.

The means used for allowing the perishable additive to perish can be selected depending upon the kind of the perishable additive used. When there is used a perishable additive which vaporizes when heated, the perishable additive can be allowed to perish by applying a heat sufficient for vaporization. When there is used a perishable additive which dissolves in an elutant when immersed therein, the perishable additive can be allowed to perish by immersion in an appropriate elutant. When there are used two or more kinds of perishable additives, the perishable additives can be allowed to perish by combining the above means.

The reason why the fuel cell separator (2) of the present invention obtained as above has, mainly at the surface, hydrophilicity and water-holding property higher than those of the fuel cell separator (1) of the present invention is not clear but is presumed to be as follows. The hydrophilicity and water-holding property of the fuel cell separator (2) originate from various unevennesses and cracks at the film surface, that is, (a) the holes formed by the perishing of the perishable additive, (b) the unevennesses and cracks caused by the secondary particles of the conductive powder (explained for the fuel cell separator (1)), and (c) the microcracks caused by film shrinkage taking place at the time of film curing. As the surface unevennesses are more, the hydrophilicity and water-holding property of the separator (2) are superior.

The fuel cell separators (1) and (2) of the present invention can have satisfactory hydrophilicty at the surface when the amount of water held per unit weight of film is 0.3 g/g or more. As the amount is larger, the water-holding property of the separator (1) or (2) is higher. However, an amount larger than 5 g/g is not preferred because the film of the separator (1) or (2) has too many unevennesses and cracks, and the strength of the film per se and the adhesivity of the film to the base material tend to be low.

The amount of water held per unit weight of film can also be expressed by pore volume, and the pore volume is in the range of 0.5 to 0.9 cc per cc of film.

The fuel cell separator of the present invention has a resistance of 0.1 to 1,000 Ω/□ at the film surface and an electrical conductivity sufficient for use as a separator.

The present invention is described in more detail below by way of Examples.

EXAMPLES 1 to 14

A conductive substance, a binder and a perishable additive were mixed using a mixer to prepare a conductive coating. This coating was applied onto a base material for fuel cell separator. In Tables 1 to 3 are shown the mixing ratio of the conductive substance, the binder and the perishable additive, the kind and surface roughening (made or not made) of the base material for fuel cell separator, and the method of application of the coating. The coating-applied base material was heated from room temperature to 120° C. at a temperature elevation rate of 40° C./hr in a drier to dry the coating-applied base material. The resulting material was immersed in hot water to elute the perishable additive, followed by drying, whereby was produced a fuel cell separator of the present invention, having a film of 60 μm in thickness superior in hydrophilicity and water-holding property.

Figure 1:
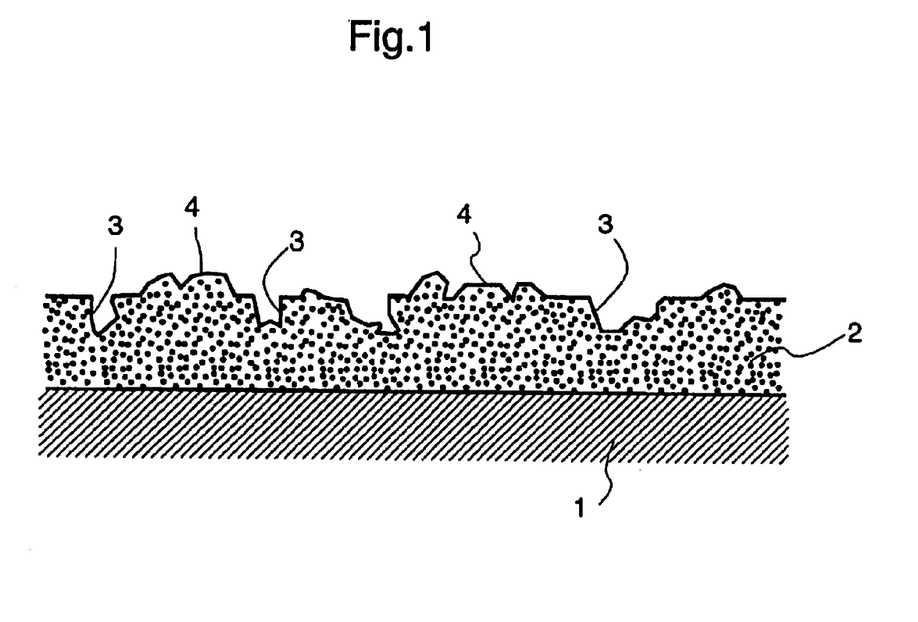
FIG. 1 is a sectional view showing an example of the fuel cell separator of the present invention.

The fuel cell separator produced above was observed for the section. As shown in FIG. 1, at the surface of or inside the film 2 (made of the conductive coating) formed on the base material 1 for fuel cell separator were seen holes 3 formed by the perishing of the perishable additive and unevennesses 4 caused by secondary particles of the conductive powder.

Each of the fuel cell separators obtained in Examples 1 to 14 was measured, as follows, for contact angle against water, surface resistance (Ω/□), amount of water held per unit weight of film (g/g), pore volume per unit volume of film (cc/cc) and adhesion of coating.

Contact Angle

Measured by the sessile drop method. That is, water was dropped on a separator film and the condition thereof was observed 30 seconds later and 5 minutes later.

Surface Resistance

Measured by the four-probe method, using Loresta SP (a product of Mitsubishi Chemical Corporation).

Amount of Water Held Per Unit Weight of Film

The weight of base material was deducted from the weight of produced separator to calculate a weight (A) of film. The separator was placed in water and subjected to vacuum degassing for 1 hour and then taken out of water; the water on the separator surface was removed. Thereafter, the weight of the resulting material was measured and the weight of separator was deducted therefrom to calculate an amount (B) of water held by the separator. Amount of water held per unit weight of film (g/g) was calculated from a formula [(B)/(A)].

Pore Volume Per Unit Volume of Film

Volume (C) of film was calculated from the area and thickness of the film of the produced separator. The film of the separator was peeled off from the separator using a metallic spatula and measured for true volume (D) by the Archimedes' method. Pore volume per unit volume of film (cc/cc) was calculated from a formula [((C)−(D))/(D)].

Adhesion of Coating

Measured according to the cross-cut method specified by JIS K 5400 (Testing Methods for Paints).

Using each fuel cell separator, a solid polymer type fuel cell was produced. The fuel cell was subjected to an electricity-generating test and the condition of the water formed in the paths of the separator was examined. The results are shown in Tables 1 to 3.

Figure 2:
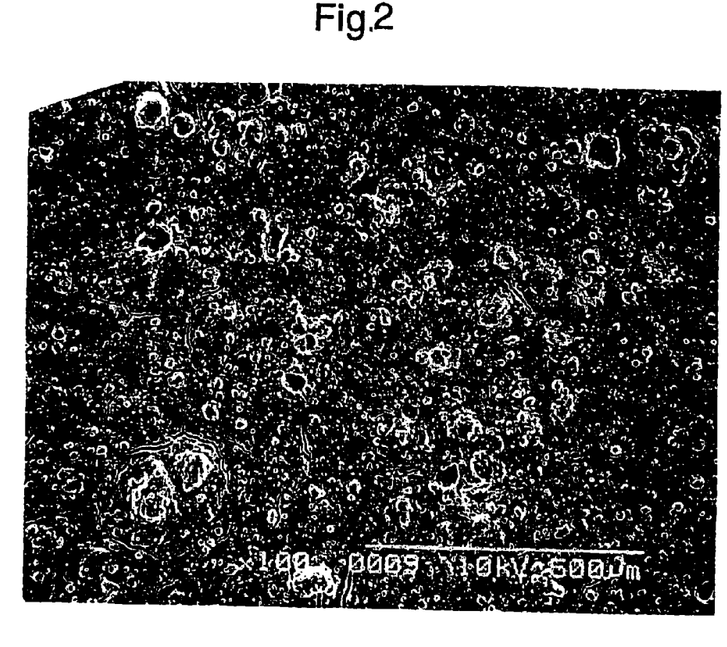
FIG. 2 is a micrograph showing the surface condition of an example of the fuel cell separator of the present invention.
Figure 3:
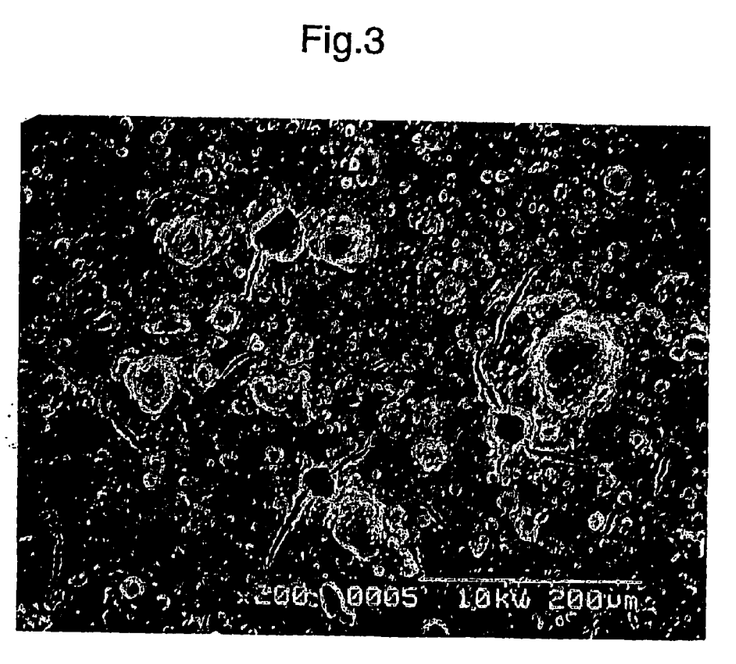
FIG. 3 is a micrograph showing the surface condition of an example of the fuel cell separator of the present invention.

Further, the typical surface condition of the film of each fuel cell separator was photographed using an electron microscope. The results are shown in FIGS. 2 and 3. There are seen holes (roughly circular black areas in each figure) formed by the perishing of the perishable additive; unevennesses (white (only in circumference) roughly circular areas in each figure) caused by the secondary particles of the conductive powder; and 1 to 20 (per 200 $\mu$m×200 $\mu$m) microcracks (black linear areas in each figure) of 10 to 150 $\mu$m in length and 1 to 5 $\mu$m in width.

TABLE 1

| Examples | | | 1 | 2 | 3 | 4 | 5 |
|---|---|---|---|---|---|---|---|
| Composition of conductive coating (parts by weight) | Conductive powder | Carbon black | 100 | 100 | 100 | 100 | 100 |
| | | Natural graphite | | | | | |
| | | Acetylene black | | | | | |
| | Binder | Phenolic resin | 150 | 150 | 150 | 240 | 70 |
| | | Acrylic resin | | | | | |
| | Perishable additive | PVA | 5 | 10 | 25 | 7 | 4 |
| Base material for separator | Kind | | C | C | C | C | C |
| | Surface roughening | | B | B | B | B | B |
| | Application of coating | | S | S | S | S | S |
| Properties of separator | Contact angle (°) | 30 seconds later | 43 | 30 | 15 | 50 | 20 |
| | | 5 minutes later | 0 | 0 | 0 | 0 | 0 |
| | | | A | A | A | A | A |
| | Surface resistance (Ω/□) | | 300 | 400 | 500 | 550 | 200 |
| | Amount of water held per film unit weight (g/g) | | 1.8 | 2.1 | 2.5 | 1.7 | 2.1 |
| | Pore volume per film unit volume (cc/cc) | | 0.8 | 0.8 | 0.8 | 0.8 | 0.8 |
| | Adhesion of coating | | 10 | 10 | 10 | 10 | 10 |
| | Separator condition in electricity generation | | A | A | A | A | A |

Notes for Tables 1 to 7 and 9
Conductive powder
Carbon black: average particle diameter = 22 nm
Natural graphite: average particle diameter = 3 $\mu$m
Acetylene black: average particle diameter = 48 nm
E: natural graphite subjected to a hydrophilization treatment with a chemical, average particle diameter = 3 $\mu$m
Kind of base material
C: carbon composite material
S: stainless steel
Surface roughening of base material
B: made (blasting)
N: not made
Application of coating
S: spray coating
D: dip coating
Contact angle
A: Water droplets sank completely into the film of separator and measurement was impossible.
Separator condition in electricity generation
A: There was no plugging of separator grooves caused by formed water.
B: There was plugging of separator grooves caused by formed water.
Total items of properties
*: Measurement was impossible owing to the peeling of film during measurement.

TABLE 2

| Examples | | | 6 | 7 | 8 | 9 | 10 |
|---|---|---|---|---|---|---|---|
| Composition of conductive coating | Conductive powder | Carbon black | | | | 100 | 100 |
| | | Natural graphite | 100 | | 100 (E) | | |

TABLE 2-continued

| Examples | | | 6 | 7 | 8 | 9 | 10 |
|---|---|---|---|---|---|---|---|
| (parts by weight) | Binder | Acetylene black | | 100 | | | |
| | | Phenolic resin | 150 | 150 | 150 | | 150 |
| | | Acrylic resin | | | | 150 | |
| | Perishable additive | PVA | 5 | 5 | 5 | 5 | 5 |
| Base material for separator | Kind | | C | C | C | C | C |
| | Surface roughening | | B | B | B | B | N |
| | Application of coating | | S | S | S | S | S |
| Properties of separator | Contact angle (°) | 30 seconds later | 60 | 50 | 60 | 50 | 47 |
| | | 5 minutes later | 0 | 0 | 0 | 0 | 0 |
| | | | A | A | A | A | A |
| | Surface resistance (Ω/□) | | 100 | 280 | 150 | 100 | 120 |
| | Amount of water held per film unit weight (g/g) | | 2.0 | 1.9 | 2.0 | 1.7 | 1.7 |
| | Pore volume per film unit volume (cc/cc) | | 0.8 | 0.8 | 0.8 | 0.8 | 0.8 |
| | Adhesion of coating | | 10 | 10 | 10 | 10 | 10 |
| | Separator condition in electricity generation | | A | A | A | A | A |

TABLE 3

| Examples | | | 11 | 12 | 13 | 14 |
|---|---|---|---|---|---|---|
| Composition of conductive coating (parts by weight) | Conductive powder | Carbon black | 100 | 100 | 100 | 100 |
| | | Natural graphite | | | | |
| | | Acetylene black | | | | |
| | Binder | Phenolic resin | 150 | 150 | 10 | 400 |
| | | Acrylic resin | | | | |
| | Perishable additive | PVA | 5 | 5 | 5 | 5 |
| Base material for separator | Kind | | C | S | C | C |
| | Surface roughening | | B | B | B | B |
| | Application of coating | | D | S | S | S |
| Properties of Separator | Contact angle (°) | 30 seconds later | 45 | 50 | 20 | 70 |
| | | 5 minutes later | 0 | 0 | 0 | 0 |
| | | | A | A | A | A |
| | Surface resistance (Ω/□) | | 100 | 90 | 300 | 300 |
| | Amount of water held per film unit weight (g/g) | | 1.9 | 1.9 | 2.5 | 0.7 |
| | Pore volume per film unit volume (cc/cc) | | 0.8 | 0.8 | 0.8 | 0.6 |
| | Adhesion of coating | | 10 | 10 | 9 | 10 |
| | Separator condition in electricity generation | | A | A | A | A |

EXAMPLES 15 to 31

A conductive substance and a binder were mixed according to a composition shown in Table 4, 5, 6 or 7 to prepare a conductive coating. This coating was applied on to a base material for separator in the same manner as in Examples 1 to 14 to produce a fuel cell separator having a film of 60 μm in thickness. Each separator obtained was measured for contact angle against water, surface resistance (Ω/□), amount of water held per unit weight of film (g/g), pore volume per unit volume of film (cc/cc) and adhesion of coating, in the same manner as in Examples 1 to 14. Using each separator, a solid polymer type fuel cell was produced. The fuel cell was subjected to an electricity-generating test, and the condition of the water formed in the paths of the separator was examined in the same manner as in Examples 1 to 14. The results are shown in Tables 4 to 7.

TABLE 4

| Examples | | | 15 | 16 | 17 | 18 | 19 |
|---|---|---|---|---|---|---|---|
| Composition of conductive coating (parts by weight) | Conductive powder | Carbon black | 100 | 100 | 100 | | |
| | | Natural graphite | | | | 100 | |
| | | Acetylene black | | | | | 100 |
| | Binder | Phenolic resin | 150 | 240 | 70 | 150 | 150 |
| | | Acrylic resin | | | | | |
| | Perishable additive | PVA | | | | | |
| Base material for separator | Kind | | C | C | C | C | C |
| | Surface roughening | | B | B | B | B | B |
| | Application of coating | | S | S | S | S | S |

TABLE 4-continued

| Examples | | | 15 | 16 | 17 | 18 | 19 |
|---|---|---|---|---|---|---|---|
| Properties of separator | Contact angle (°) | 30 seconds later | 56 | 60 | 35 | 72 | 61 |
| | | 5 minutes later | 0 | 0 | 0 | 0 | 0 |
| | | | A | A | A | A | A |
| | Surface resistance (Ω/□) | | 250 | 520 | 150 | 70 | 240 |
| | Amount of water held per film unit weight (g/g) | | 1.0 | 0.9 | 1.2 | 1.0 | 0.9 |
| | Pore volume per film unit volume (cc/cc) | | 0.7 | 0.6 | 0.7 | 0.7 | 0.6 |
| | Adhesion of coating | | 10 | 10 | 10 | 10 | 10 |
| | Separator condition in electricity generation | | A | A | A | A | A |

TABLE 5

| Examples | | | 20 | 21 | 22 | 23 | 24 |
|---|---|---|---|---|---|---|---|
| Composition of conductive coating (parts by weight) | Conductive powder | Carbon black | | 100 | 100 | 100 | 100 |
| | | Natural graphite | 100 (E) | | | | |
| | | Acetylene black | | | | | |
| | Binder | Phenolic resin | 150 | | 32 | 150 | 150 |
| | | Acrylic resin | | 150 | | | |
| | Perishable additive | PVA | | | | | |
| Base material for separator | Kind | | C | C | C | C | S |
| | Surface roughening | | B | B | B | B | B |
| | Application of coating | | S | S | D | S | S |
| Properties of separator | Contact angle (°) | 30 seconds later | 68 | 60 | 50 | 55 | 65 |
| | | 5 minutes later | 0 | 0 | 0 | 0 | 0 |
| | | | A | A | A | A | A |
| | Surface resistance (Ω/□) | | 100 | 100 | 70 | 240 | 60 |
| | Amount of water held per film unit weight (g/g) | | 1.0 | 1.1 | 0.9 | 1.5 | 1.0 |
| | Pore volume per film unit volume (cc/cc) | | 0.7 | 0.7 | 0.6 | 0.7 | 0.6 |
| | Adhesion of coating | | 10 | 10 | 10 | 10 | 10 |
| | Separator condition in electricity generation | | A | A | A | A | A |

TABLE 6

| Examples | | | 25 | 26 | 27 | 28 | 29 |
|---|---|---|---|---|---|---|---|
| Composition of conductive coating (parts by weight) | Conductive powder | Carbon black | | | | | |
| | | Natural graphite | 100 | 50 | 65 | 100 | 100 |
| | | Acetylene black | | 50 | 35 | | |
| | Binder | Phenolic resin | 32 | 32 | 32 | 5 | 300 |
| | | Acrylic resin | | | | | |
| | Perishable additive | PVA | | | | | |
| Base material for separator | Kind | | C | C | C | C | C |
| | Surface roughening | | B | B | B | B | B |
| | Application of coating | | S | S | S | S | S |
| Properties of separator | Contact angle (°) | 30 seconds later | 59 | 55 | 45 | 62 | 65 |
| | | 5 minutes later | 0 | 0 | 0 | 0 | 0 |
| | | | A | A | A | A | A |
| | Surface resistance (Ω/□) | | 150 | 5 | 20 | 40 | 300 |
| | Amount of water held per film unit weight (g/g) | | 1.2 | 1.3 | 1.6 | 1.4 | 0.5 |
| | Pore volume per film unit volume (cc/cc) | | 0.7 | 0.7 | 0.8 | 0.7 | 0.5 |
| | Adhesion of coating | | 10 | 8 | 10 | 10 | 10 |
| | Separator condition in electricity generation | | A | A | A | A | A |

TABLE 7

| Examples | | | 30 | 31 |
|---|---|---|---|---|
| Composition of conductive coating (parts by weight) | Conductive powder | Carbon black | | |
| | | Natural graphite | 75 | 50 |
| | | Acetylene black | 65 | 50 |
| | Binder | Phenolic resin | 32 | 5 |
| | | Acrylic resin | | |
| | Perishable additive | PVA | | |
| Base material for separator | Kind | | C | C |
| | Surface roughening | | B | B |
| | Application of coating | | S | S |
| Properties of separator | Contact angle (°) | 30 seconds later | 48 | 48 |
| | | 5 minutes later | 0 | 0 |
| | | | A | A |
| | Surface resistance (Ω/□) | | 40 | 3 |
| | Amount of water held per film unit weight (g/g) | | 1.8 | 1.9 |
| | Pore volume per film unit volume (cc/cc) | | 0.8 | 0.8 |
| | Adhesion of coating | | 10 | 8 |
| | Separator condition in electricity generation | | A | A |

EXAMPLES 32 to 36

A conductive substance and a binder were mixed according to a composition shown in Table 8 to prepare a conductive coating. This coating was applied onto a base material for separator in the same manner as in Examples 1 to 14 to produce a fuel cell separator having a thickness as shown in Table 8. Each separator obtained was measured for contact angle against water, surface resistance (Ω/□), amount of water held per unit weight of film (g/g), pore volume per unit volume of film (cc/cc), adhesion of coating and an electrical resistance in a through-plane direction (mΩ/cm$^2$) The results are shown in Table 8.

Incidentally, the electrical resistance in a through-plane direction (mΩ/cm$^2$) was measured by a method disclosed in JP-B-1988-294610, namely, the separator obtained was cut in a size of 63.5×63.5 mm and 2 mm in thickness, interposed between copper plates and measured for an electrical resistance under a pressure of 10 Kg·cm$^2$.

TABLE 8

| Examples | | | 32 | 33 | 34 | 35 | 36 |
|---|---|---|---|---|---|---|---|
| Composition of conductive coating (parts by weight) | Conductive powder | Carbon black Natural graphite Acetylene black | 100 | 100 | 100 | 100 | 100 |
| | Binder | Phenolic resin Acrylic resin | 150 | 150 | 150 | 150 | 150 |
| | Perishable additive | PVA | 5 | 5 | 5 | 5 | 5 |
| Base material for separator | Kind | | C | C | C | C | C |
| | Surface roughening | | B | B | B | B | B |
| | Application of coating | | S | S | S | S | S |
| Properties of separator | Thickness of Film (μm) | | 1 | 20 | 60 | 100 | 200 |
| | Contact angle (°) | 30 seconds later | 45 | 47 | 43 | 42 | 46 |
| | | 5 minutes later | 0 | 0 | 0 | 0 | 0 |
| | | | A | A | A | A | A |
| | Surface resistance Ω/□) | | 850 | 320 | 300 | 290 | 500 |
| | Amount of water held per film unit weight (g/g) | | 0.6 | 1.0 | 1.8 | 2.0 | 2.2 |
| | Pore volume per film unit volume (cc/cc) | | 0.7 | 0.8 | 0.8 | 0.8 | 0.8 |
| | Adhesion of coating | | 4 | 6 | 10 | 7 | 4 |
| | Separator condition in electricity generation | | A | A | A | A | A |
| | Electrical Resistance in a through-plane Direction (mΩ/cm$^2$) | | 30.4 | 12.1 | 13.0 | 13.9 | 26.5 |

COMPARATIVE EXAMPLE 1

Natural graphite and a phenolic resin were mixed. The resulting mixture was molded into a separator shape to produce a fuel cell separator. The separator was measured for contact angle against water in the same manner as in the Examples. Also in the same manner as in the Examples, a solid polymer type fuel cell was produced using the separator and subjected to an electricity-generating test to examine the condition of the water formed in the paths of the separator. The results are shown in Table 9.

COMPARATIVE EXAMPLE 2

An expanded graphite sheet was molded into a separator shape to produce a fuel cell separator. The separator was measured for contact angle against water in the same manner as in the Examples. Also in the same manner as in the Examples, a solid polymer type fuel cell was produced using the separator and subjected to an electricity-generating test to examine the condition of the water formed in the paths of the separator. The results are shown in Table 9.

COMPARATIVE EXAMPLE 3

A stainless steel sheet was molded into a separator shape to produce a fuel cell separator. The separator was measured for contact angle against water in the same manner as in the Examples. Also in the same manner as in the Examples, a solid polymer type fuel cell was produced using the separator and subjected to an electricity-generating test to examine the condition of the water formed in the paths of the separator. The results are shown in

TABLE 9

|  |  | Comparative Examples | | |
|---|---|---|---|---|
|  |  | 1 | 2 | 3 |
| Kind of separator | | Carbon composite material | Expanded graphite | Stainless steel |
| Contact angle (°) | 30 seconds later | 85 | 75 | 72 |
|  | 5 minutes later | 85 | 75 | 72 |
| Separator condition in electricity generation | | Separator grooves were plugged by formed water. | Same as left | Same as left |

COMPARATIVE EXAMPLES 4 to 9

A conductive coating was prepared according to a composition shown in Table 10. The coating was applied onto a base material for separator in the same manner as in the Examples 1 to 14 to produce a separator having a thickness as shown in Table 10. Each separator produced was measured, in the same manner as in Examples 1 to 14, for contact angle against water, surface resistance ($\Omega/\square$), amount of water held per unit weight of film (g/g), pore volume per unit volume of film (cc/cc), adhesion of coating and an electrical resistance in a through-plane direction (m$\Omega$/cm$^2$). Using each separator, a solid polymer type fuel cell was produced. The fuel cell was subjected to an electricity-generating test, and the condition of the water formed in the paths of the separator was examined in the same manner as in Examples 1 to 14. The results are shown in Table 10.

TABLE 10

| Comparative Examples | | | 4 | 5 | 6 | 7 | 8 | 9 |
|---|---|---|---|---|---|---|---|---|
| Composition of conductive coating (parts by weight) | Conductive powder | Carbon black | 100 | 100 | 100 | 100 | 100 | 100 |
|  |  | Natural graphite | | | | | | |
|  |  | Acetylene black | | | | | | |
|  | Binder | Phenolic resin | 0.5 | 1500 | 0.5 | 1500 | 150 | 150 |
|  |  | Acrylic resin | | | | | | |
|  | Perishable additive | PVA | 5 | 5 | | | 5 | 5 |
| Base material for separator | Kind | | C | C | C | C | C | C |
|  | Surface roughening | | B | B | B | B | B | B |
|  | Application of coating | | S | S | S | S | S | S |
| Properties of separator | Thickness of Film ($\mu$m) | | * | 60 | * | 60 | 0.1 | 500 |
|  | Contact angle (°) | 30 seconds later | * | 90 | * | 106 | 46 | 45 |
|  |  | 5 minutes later | * | 90 | * | 106 | 0 A | 0 A |
|  | Surface resistance ($\Omega/\square$) | | * | $10^4$ | * | 8000 | 5900 | 3600 |
|  | Amount of water held per film unit weight (g/g) | | * | 0.08 | * | 0.03 | 0.4 | 2.2 |
|  | Pore volume per film unit volume (cc/cc) | | * | 0.1 | * | 0.07 | 0.7 | 0.8 |
|  | Adhesion of coating | | 0 | 10 | 0 | 10 | 1 | 1 |
|  | Separator condition in electricity generation | | * | B | * | B | A | A |
|  | Electrical Resistance in a through-plane direction (m$\Omega$/cm$^2$) | | * | 1200 | * | 1000 | 1000 | 1600 |

The fuel cell separator of the present invention has a film made of a conductive coating and thereby has high hydrophilicity and water-holding property, and has at the same time low electrical resistance. Therefore, in the present fuel cell separator, the plugging of separator grooves (paths for reactant gas) by the water formed during electricity generation can be significantly reduced.

Further, since the film of the separator has a water-holding property, the water trapped in the separator grooves can control the humidity inside the fuel cell, making an external humidifier (which has been essential for conventional fuel cells) unnecessary or significantly small-sized.

What is claimed is:

1. A separator for a fuel cell, comprising a base material in the form of a flat plate having a plurality of parallel grooves at one or both sides thereof, and a film comprising a conductive powder and a binder on a surface of the base material, wherein the conductive powder is a carbon powder and the film has a water-holdability of 0.3 to 5.0 g per g of the film, and a thickness of 0.5 to 300 $\mu$m.

2. The separator for a fuel cell of claim 1, wherein the conductive powder has an average particle diameter of 10 nm to 100 $\mu$m.

3. The separator for a fuel cell of claim 2, wherein the film has a water-holdability of 0.3 to 3.0 g per g of the film.

4. The separator for a fuel cell of claim 1, wherein the film has a water-holdability of 0.3 to 3.0 g per g of the film.

5. A separator for a fuel cell, comprising a base material in the form of a flat plate having a plurality of parallel grooves at one or both sides thereof, and a film comprising a conductive powder and a binder on a surface of the base material, wherein the binder is selected from the group consisting of a thermosetting resin, a thermoplastic resin and a rubber and the film has a water-holdability of 0.3 to 5.0 g per g of the film, and a thickness of 0.5 to 300 $\mu$m.

6. The separator for a fuel cell of claim 5, wherein the film has a water-holdability of 0.3 to 3.0 g per g of the film.

7. The separator for a fuel cell of claim 5, wherein the conductive powder has an average particle diameter of 10 nm to 100 $\mu$m.

8. The separator for a fuel cell of claim 7, wherein the film has a water-holdability of 0.3 to 3.0 g per g of the film.

* * * * *